(12) United States Patent
Yano et al.

(10) Patent No.: US 6,682,848 B1
(45) Date of Patent: Jan. 27, 2004

(54) ALKALINE STORAGE BATTERY AND PROCESS FOR THE PRODUCTION THEREOF

(75) Inventors: Takayuki Yano, Itano-Gun (JP); Masao Takee, Itano-Gun (JP); Akifumi Yamawaki, Naruto (JP)

(73) Assignee: Sanyo Electric Co., Ltd., Osaka (JP)

( * ) Notice: Subject to any disclaimer, the term of this patent is extended or adjusted under 35 U.S.C. 154(b) by 462 days.

(21) Appl. No.: 09/669,572

(22) Filed: Sep. 26, 2000

(30) Foreign Application Priority Data

Sep. 30, 1999 (JP) .............................. 11-277996

(51) Int. Cl.$^7$ ............................................. H01M 10/24
(52) U.S. Cl. ...................................... 429/206; 429/233
(58) Field of Search ................................. 429/233, 241, 429/242, 206

(56) References Cited

U.S. PATENT DOCUMENTS

| | | |
|---|---|---|
| 5,849,430 A | 12/1998 | Lee |
| 6,274,275 B1 * | 8/2001 | Yamawaki et al. ............... 29/2 |
| 6,333,125 B1 * | 12/2001 | Shinyama et al. .......... 429/223 |
| 6,368,748 B1 * | 4/2002 | Takee et al. ................. 429/206 |

FOREIGN PATENT DOCUMENTS

| | | |
|---|---|---|
| EP | 0 884 793 A1 | 12/1998 |
| JP | A-60-246561 | 12/1985 |
| JP | A-62-136760 | 6/1987 |
| JP | A-10-223215 | 8/1998 |

\* cited by examiner

*Primary Examiner*—Patrick Ryan
*Assistant Examiner*—Monique Wills
(74) *Attorney, Agent, or Firm*—Nixon & Vanderhye P.C.

(57) ABSTRACT

A porous metal material 10 was filled with an active material slurry, dried, and then rolled to a predetermined thickness. This rolling causes pores 11 formed by a network skeleton to be stretched in the rolling direction (direction represented by the arrow in FIG. 1(*a*)) to form pores 12 having a shape similar to ellipsoid or deformed ellipsoid having a long axis. Subsequently, the porous metal material was cut in such an arrangement that the longitudinal direction of the pores 12 having a shape similar to ellipsoid or deformed ellipsoid coincides with the crosswise direction of the electrode plate, and then subjected to roller treatment through a series of rollers in the longitudinal direction of the electrode plate. This roller treatment causes numerous cracks 14 to be formed at a very small pitch in the direction parallel to the rolling direction as shown diagrammatically in FIG. 1(*c*).

5 Claims, 5 Drawing Sheets

ALKALINE STORAGE BATTERY AND PROCESS FOR THE PRODUCTION THEREOF

BACKGROUND OF THE INVENTION

1. Field of the Invention

The present invention relates to an alkaline storage battery such as nickel-hydrogen storage battery and nickel-cadmium storage battery and method of fabricating thereof. More particularly, the present invention relates to an improvement in an alkaline storage battery comprising an electrode block obtained by spirally winding a non-sintered electrode having a porous metal material provided with a three-dimensionally continuous network skeleton filled with an active material with an opposing electrode with a separator a provided interposed therebetween and a process for the production thereof.

2. Description of the Related Art

As a nickel electrode to be incorporated in an alkaline storage battery such as nickel-cadmium storage battery and nickel-hydrogen storage battery there has heretofore been used a so-called non-sintered electrode plate comprising a porous metal material (active material retainer) having a three-dimensionally continuous network skeleton filled with an active material. This kind of a porous metal material having a three-dimensionally continuous network skeleton has a porosity as high as about 95% and thus can be filled with an active material at a high density, making it possible to obtain a high capacity battery. At the same time, since this kind of a non-sintered electrode plate can be prepared by filling a porous metal material with an active material as it is, the necessity for a troublesome treatment for activation can be eliminated, making it easy to produce a storage battery. The treatment for activation comprises a step of generating electrode active material and a step of immersing the electrode active material.

In recent years, there has been a growing demand for the enhancement of battery capacity. This demand for the enhancement of battery capacity has been met by raising the packing of an active material. However, the increase of the packing of an active material leads to the increase of the packing density of the active material or the increase of the electrode plate that causes the electrode to harden. Thus, the electrode plate shows a drastically deteriorated windability when spirally wound, lowering the yield in production and the battery quality. Then, an approach which comprises providing an electrode plate filled with an active material with flexibility to improve the windability thereof has been proposed in JP-A-60-246561 (The term "JP-A" as used herein means an "unexamined published Japanese patent application"), JP-A-62-136760, and JP-A-10-223215.

The methods proposed in the above cited patents comprise filling a porous metal material having a three-dimensionally continuous network skeleton with an active material, pressing the porous metal material at a predetermined pressure, and then passing the porous metal material through a leveler device provided with a number of rollers. By thus passing an electrode plate filled with an active material which has been pressed through a leveler, many cracks are produced on the surface of the electrode plate, enhancing the flexibility of the electrode plate and hence making it possible to wind the electrode plate smoothly.

In accordance with the methods proposed in the above cited methods, however, a porous metal material having a three-dimensionally continuous network skeleton filled with an active material which has been rolled is then subjected to roller treatment in the same direction as the rolling direction, causing cracks to be introduced in the direction perpendicular to the rolling direction. Accordingly, the direction of production of cracks is parallel to the winding axis. As a necessary consequence, the rolling direction of the electrode plate coincides with the direction of spiral winding.

Therefore, a load is always applied to the porous metal material having a three-dimensionally continuous network skeleton in the same direction at various steps of filling of active material, rolling and roller treatment. Accordingly, the three-dimensionally continuous network skeleton constituting the porous metal material undergoes plastic deformation resulting in work hardening. As a result, even if the electrode plate is subjected to roller treatment so that cracks are introduced into the electrode plate, it is difficult to improve the windability thereof.

In order to improve the windability of the electrode plate by introducing cracks into the electrode plate, it is necessary to provide the electrode plate with cracks at a very small pitch in the winding direction of the electrode plate. However, since the pores formed by the three-dimensionally continuous network skeleton in the porous metal material are stretched such that the resulting planar shape has a long axis in the rolling direction. The occurrence of pores which have been stretched to have a long axis makes it difficult to provide cracks at a reduced pitch and hence improve the windability of the electrode plate.

Therefore, the present invention has been worked out to solve the foregoing problems. The relationship between the rolling direction of the electrode plate filled with an active material and the direction of roller treatment was studied. As a result, it was found that when these directions are perpendicular to each other, the windability of electrode plate can be improved. The present invention has been worked out on the basis of such a knowledge. The first object of the invention is to obtain an electrode body having an improved windability of electrode plate and hence provide a high capacity storage battery having an excellent high rate dischargeability. The second object of the invention is to provide a method of fabricating an electrode body having an improved windability of electrode plate.

The present invention has been worked out to accomplish the foregoing objects. In order to accomplish the first object of the invention, the alkaline storage battery according to the invention has an arrangement such that pores formed by a network skeleton in the porous metal material on the plane thereof are stretched to have a planar shape similar to ellipsoid or deformed ellipsoid having a long axis, cracks are formed in the non-sintered electrode in parallel to the longitudinal direction of the pores, and the electrode plates are spirally wound in such an arrangement that the cracks are oriented parallel to the winding axis.

Preferably the cracks are arranged at a very small pitch in the crosswise direction of the pores.

Thus, when cracks are formed in parallel to the longitudinal direction of pores which have been stretched to have a shape similar to ellipsoid or deformed ellipsoid having a long axis, these cracks are oriented in the crosswise direction of the pores which have been stretched to have a shape similar to ellipsoid or deformed ellipsoid so that they are arranged at a very small pitch. Accordingly, by spirally winding this electrode plate on a winding axis parallel to these cracks, an electrode coil having an substantially round shape can be formed. As a result, the windability of the electrode plate can be improved, making it possible to obtain a high capacity and quality storage battery.

Further, cracks are formed at a very small pitch. The cracks are finely divided. At the same time, since the spiral electrode block is round to cause dispersion of structural pressure, shortcircuiting caused by cracking can be prevented. At the same time, since the electrode plate is wound in the crosswise direction of the pores formed by a network skeleton, the load applied to the porous metal material during winding can be reduced, inhibiting local elongation of the electrode plate and hence preventing the occurrence of defects such as break of network skeleton in the porous metal material. As a result, the collecting properties can be improved, making it possible to obtain a high capacity and quality storage battery.

Further, said cracks are arranged at a very small pitch in the crosswise direction of said pores.

Preferably said electrode block spirally wounded is formed so as to be real enhanced roundness.

Preferably, said porous metal body is made of formed nickel. In order to accomplish the second object of the invention, the method of fabricating an alkaline storage battery of the invention comprises a rolling step of a step of filling a porous metal material with an active material in the network skeleton thereof to form a non-sintered electrode and rolling the non-sintered electrode to a predetermined thickness, a roller treatment step of passing the non-sintered electrode which has been rolled to a predetermined thickness through a series of rollers in the direction perpendicular to the rolling direction at the rolling step so that cracks which are oriented at a very small pitch in the direction perpendicular to the rolling direction are formed in parallel to the rolling direction, and a winding step of winding the non-sintered electrode in such an arrangement that the cracks formed at the roller treatment step are oriented in parallel to the winding axis.

When the non-sintered electrode having a porous metal material filled with an active material in the network skeleton thereof is rolled to a predetermined thickness at the rolling step, the pores formed by the network skeleton are stretched to have a planar shape similar to ellipsoid or deformed ellipsoid having a long axis. Subsequently, when the non-sintered electrode is passed through a series of rollers so that cracks thus formed are oriented in the direction perpendicular to the rolling direction, the cracks are oriented in the crosswise direction of the pores which have been stretched to have a shape similar to ellipsoid or deformed ellipsoid. Thus, cracks are formed at a very small pitch.

Subsequently, when the non-sintered electrode is wound at the winding step in such an arrangement that the direction of cracks is parallel to the winding axis, winding can be easily effected, making it possible to form an electrode coil having a substantially round shape. At the same time, since the non-sintered electrode plate is wound in the crosswise direction of the pores, the load applied to the porous metal material during winding can be reduced, inhibiting local elongation of the electrode plate and hence preventing the occurrence of defects such as break of network skeleton in the porous metal material. As a result, the collecting properties can be improved, making it possible to obtain a high capacity and quality storage battery.

In the case where the weight of the porous metal material having a three-dimensionally continuous network skeleton is constant, as the number of pores formed by a network skeleton on the plane of the porous metal material per inch of length, i.e., PPI decreases, the diameter of pores increases and the pitch between cracks increases. On the contrary, as PPI increases, the diameter of pores decreases and the pitch between cracks decreases. Accordingly, when the present invention is applied to a non-sintered electrode provided with a porous metal material having a three-dimensionally network skeleton with PPI of 200 or less, a substantially round spiral electrode body can be obtained to exert a further effect.

Further, when an active material is packed at a high density, a high capacity storage battery can be obtained. However, when the packing density of active material is raised, the electrode plate hardens. On the other hand, when the packing density of active material is lowered, the electrode plate doesn't harden, improving the windability thereof. In order to attain the effect that makes it possible to wind the non-sintered electrode in the crosswise direction of the pores formed by the network skeleton on the plane thereof, the packing density of active material is preferably 2.6 g/cm$^3$-void or more taking into account the ability to enhance capacity and the windability. The term "packing density (g/cm$^3$-void) of active material" as used herein is meant to indicate the weight of the active material packed per volume of void excluding the metal portion in the porous metal material provided with a three-dimensionally continuous network skeleton.

Preferably the process further comprises a step of cutting the wherein said porous metal material filled with said active material so as to have a predetermined width after rolling step and prior to the roller treatment step.

BRIEF DESCRIPTION OF THE DRAWINGS

FIG. 1 is a view diagrammatically illustrating the electrode plate of Example according to production process, wherein

FIG. 2 is a view diagrammatically illustrating the electrode plate of Comparative Example 1 according to production process, wherein

FIG. 3 is a view diagrammatically illustrating the electrode plate of Comparative Example 2 according to production process, wherein

FIG. 4 is a view diagrammatically illustrating the electrode plate of Comparative Example 3 according to production process, wherein

DESCRIPTION OF THE PREFERRED EMBODIMENTS

An embodiment of implication of the present invention will be described with reference to the case where the present invention is applied to nickel-hydrogen storage battery in connection with the accompanying drawings. The present invention should not be construed as being limited to the following embodiments and may be implied in properly modified embodiments so far as it doesn't depart from the scope thereof.

Figure 1A:
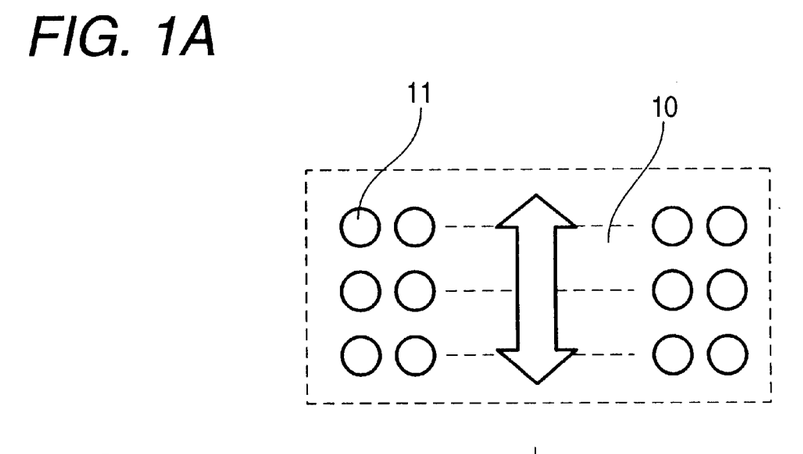
FIG. 1(a) is a plan view diagrammatically illustrating a portion of an active material retainer.
Figure 1B:
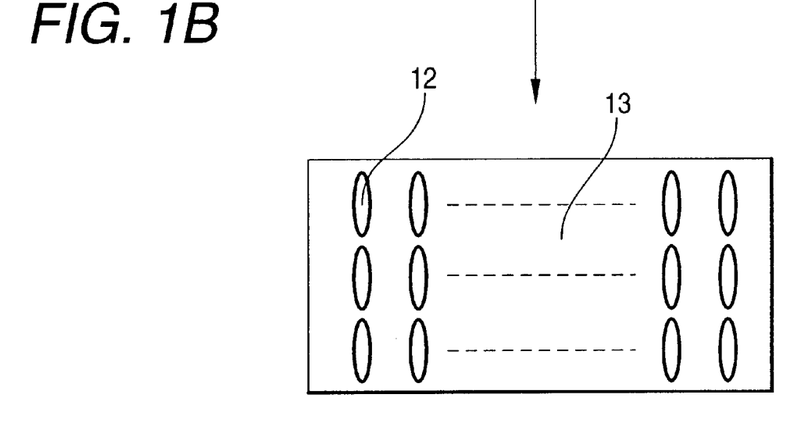
FIG. 1(b) is a plan view diagrammatically illustrating the conditions of a sheet of electrode plate obtained by cutting the active material retainer which has been rolled.
Figure 1C:
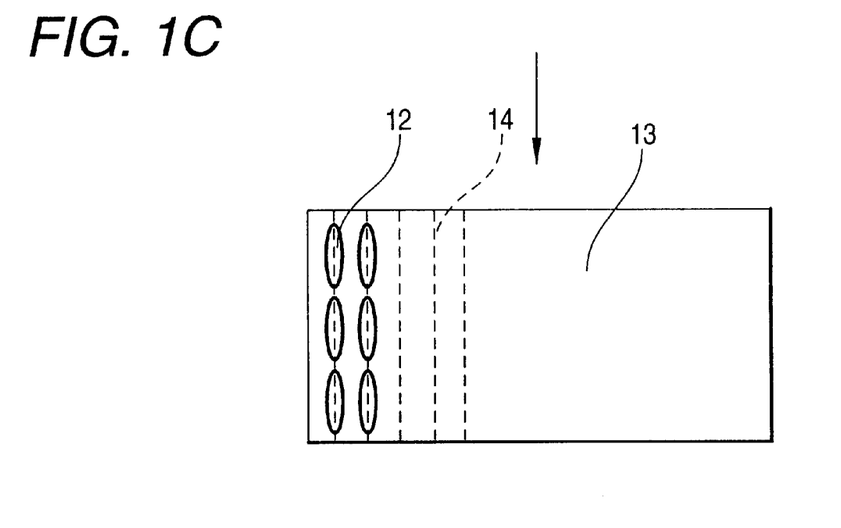
FIG. 1(c) is a view diagrammatically illustrating the conditions of the electrode plate which has been subjected to roller treatment.

FIG. 1 is a view diagrammatically illustrating the electrode plate of Example according to production process, wherein FIG. 1(a) is a plan view diagrammatically illustrating a portion of an active material retainer, FIG. 1(b) is a plan view diagrammatically illustrating the conditions of a sheet of electrode plate obtained by cutting the active material retainer which has been rolled, and FIG. 1(c) is a view diagrammatically illustrating the conditions of the electrode plate which has been subjected to roller treatment.

Figure 2A:
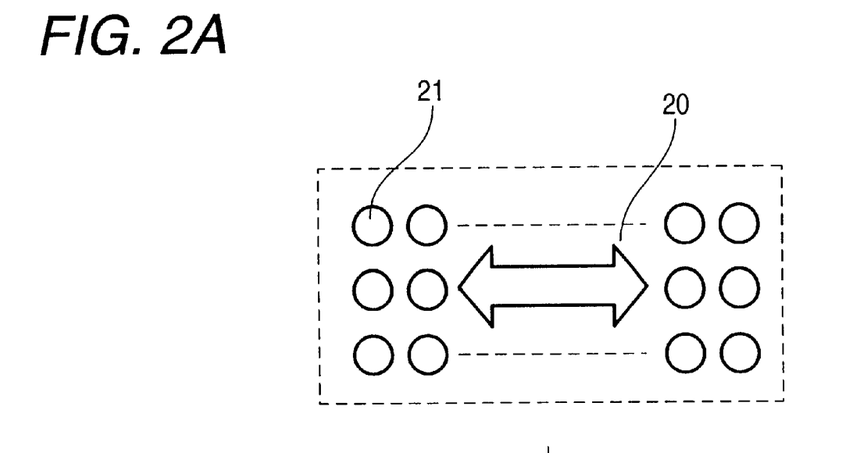
FIG. 2(a) is a plan view diagrammatically illustrating a portion of an active material retainer.
Figure 2B:
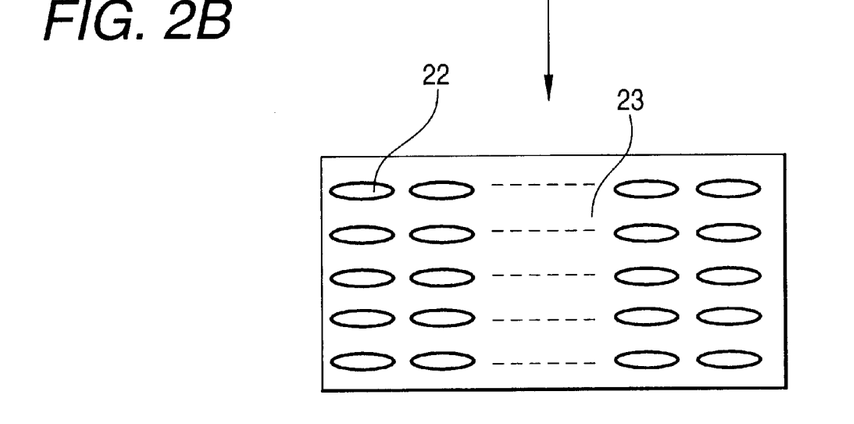
FIG. 2(b) is a plan view diagrammatically illustrating the conditions of a sheet of electrode plate obtained by cutting the active material retainer which has been rolled.
Figure 2C:
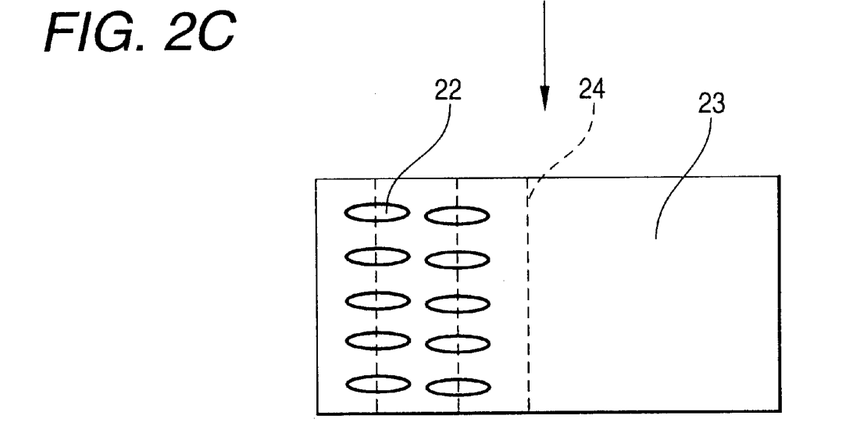
FIG. 2(c) is a view diagrammatically illustrating the conditions of the electrode plate which has been subjected to roller treatment.

FIG. 2 is a view diagrammatically illustrating the electrode plate of Comparative Example 1 according to production process, wherein FIG. 2(a) is a plan view diagrammatically illustrating a portion of an active material retainer, FIG. 2(b) is a plan view diagrammatically illustrating the conditions of a sheet of electrode plate obtained by cutting the active material retainer which has been rolled, and FIG. 2(c) is a view diagrammatically illustrating the conditions of the electrode plate which has been subjected to roller treatment.

Figure 3A:
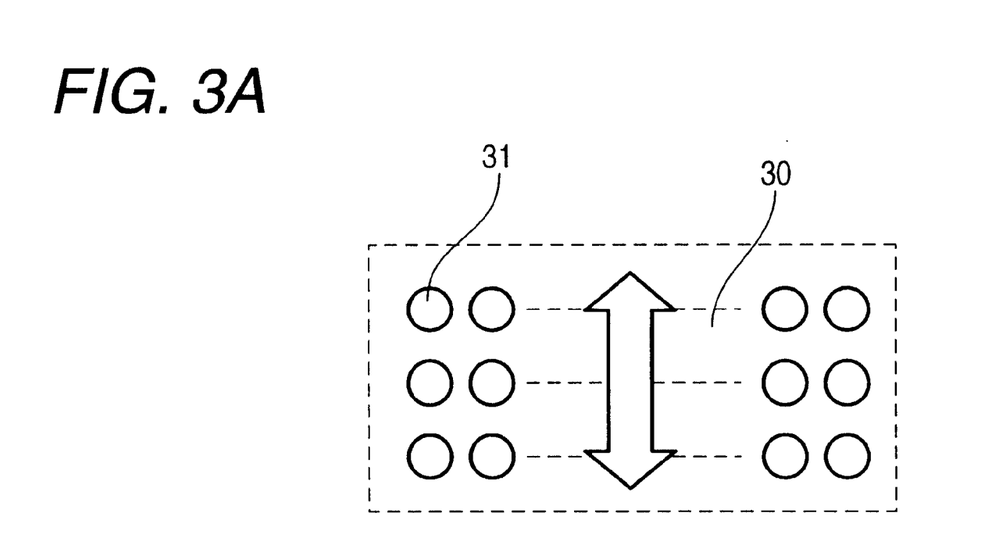
FIG. 3(a) is a plan view diagrammatically illustrating a portion of an active material retainer.
Figure 3B:
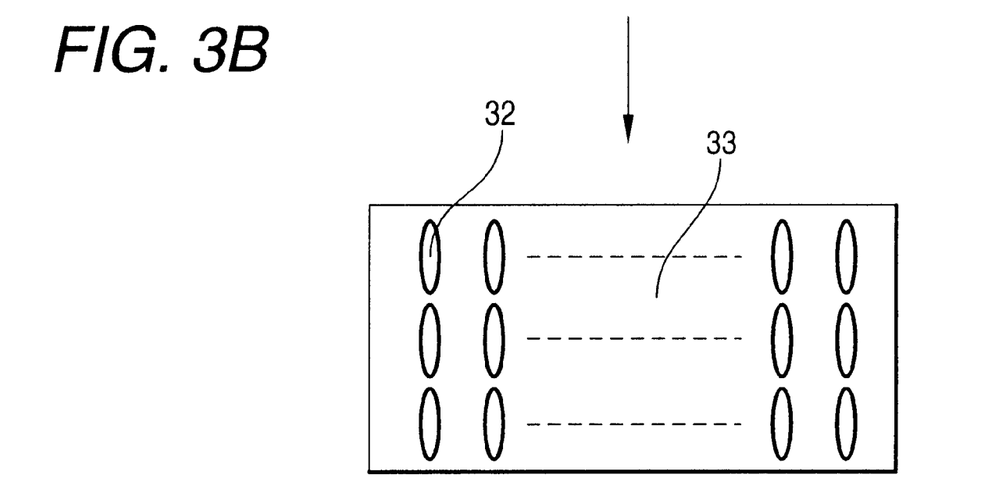
FIG. 3(b) is a plan view diagrammatically illustrating the conditions of a sheet of electrode plate obtained by cutting the active material retainer which has been rolled.

FIG. 3 is a view diagrammatically illustrating the electrode plate of Comparative Example 2 according to production process, wherein FIG. 3(a) is a plan view diagrammatically illustrating a portion of an active material retainer, and FIG. 3(b) is a plan view diagrammatically illustrating the conditions of a sheet of electrode plate obtained by cutting the active material retainer which has been rolled.

Figure 4A:
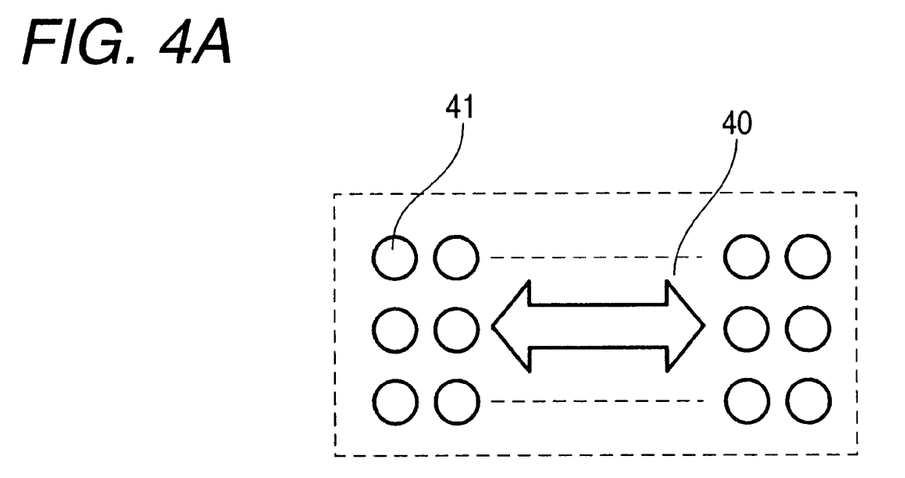
FIG. 4(a) is a plan view diagrammatically illustrating a portion of an active material retainer.
Figure 4B:
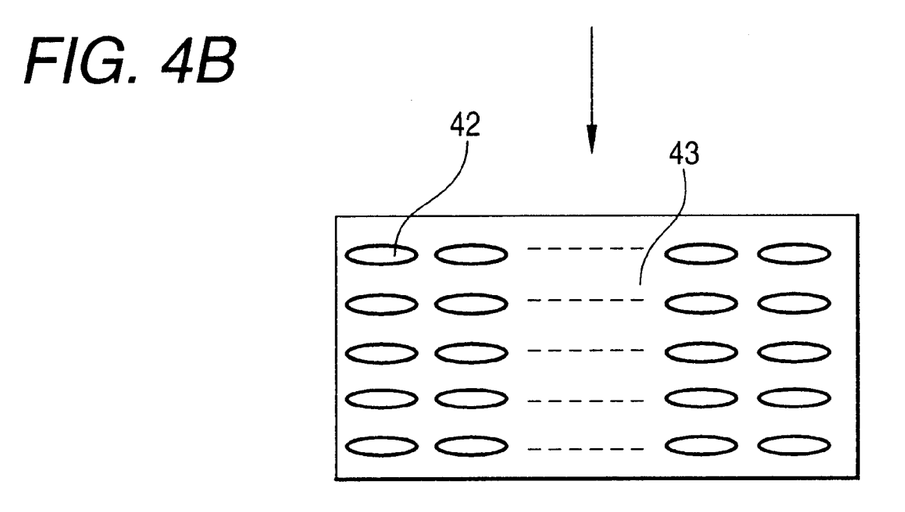
FIG. 4(b) is a plan view diagrammatically illustrating the conditions of a sheet of electrode plate obtained by cutting the active material retainer which has been rolled.

FIG. 4 is a view diagrammatically illustrating the electrode plate of Comparative Example 3 according to production process, wherein FIG. 4(a) is a plan view diagrammatically illustrating a portion of an active material retainer, and FIG. 4(b) is a plan view diagrammatically illustrating the conditions of a sheet of electrode plate obtained by cutting the active material retainer which has been rolled.

Figure 5:
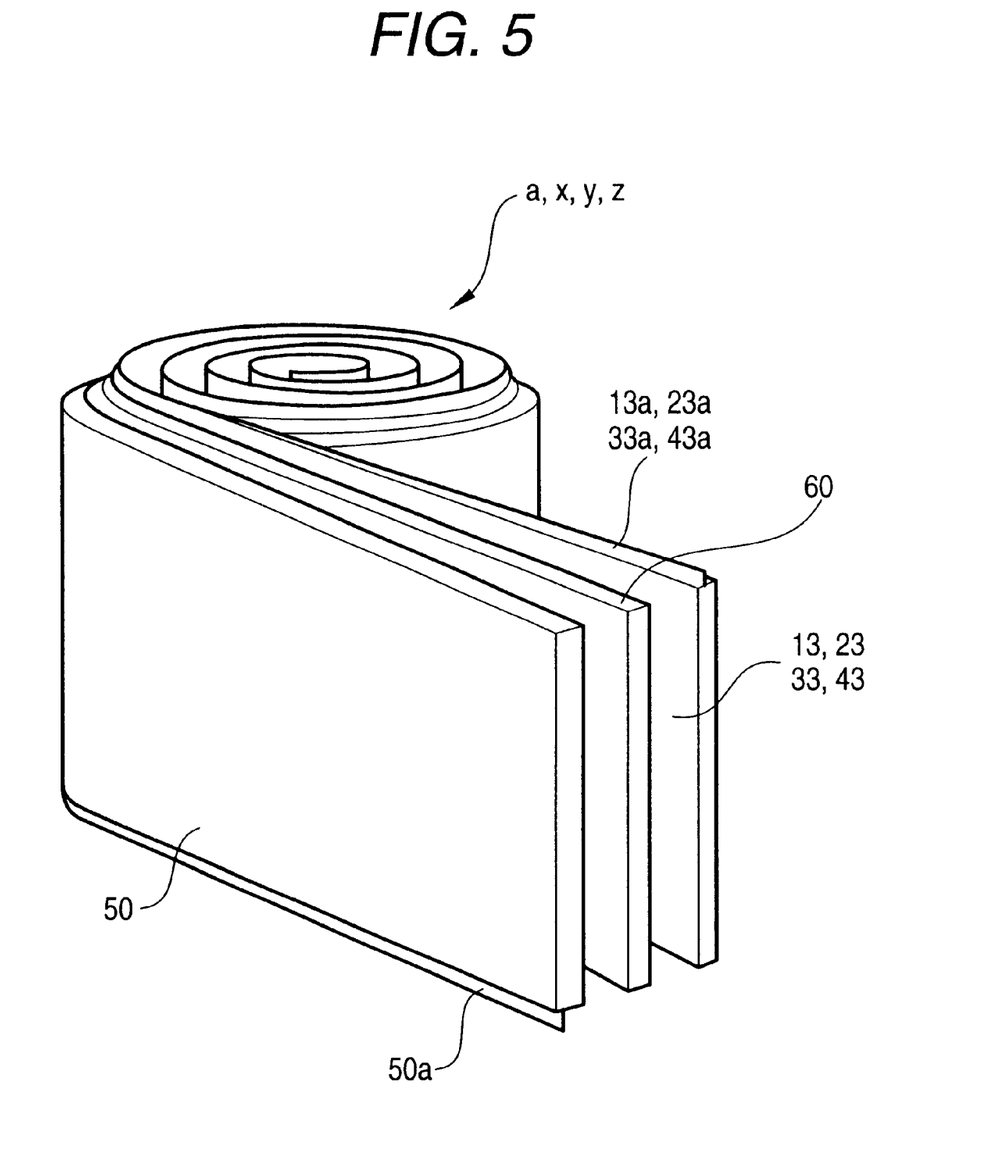
FIG. 5 is a perspective view diagrammatically illustrating the conditions of a coil obtained by spirally winding the electrode plate with a negative electrode plate.

FIG. 5 is a perspective view diagrammatically illustrating the conditions of a coil obtained by spirally winding the electrode plate with a negative electrode plate.

1. Preparation of Nickel Positive Electrode (1) EXAMPLE 100 parts by weight of an active material powder mainly composed of nickel hydroxide (containing a small amount of zinc and cobalt), 40 parts by weight of a 0.2 wt-% aqueous solution of hydroxypropyl cellulose and 1 part by weight of a PTFE dispersion were mixed to prepare an active material slurry.

A porous metal material (active material retaining material) 10 comprising a foamed nickel material (provided with a three-dimensionally continuous network skeleton) having a porosity of 97% and a thickness of about 1.5 mm was then filled with the active material slurry in such an amount that the active material packing density after rolling reached 2.8 g/cm$^3$-void. As shown diagrammatically in FIG. 1(a), the porous metal material 10 is provided with numerous pores 11 formed by a network skeleton on the plane thereof. PPI (number of pores per inch of length) of these numerous pores 11 is adjusted to 50.

The porous metal material 10 was dried, and then rolled to a thickness of about 0.7 mm. As shown diagrammatically in FIG. 1(b), this rolling causes the pores 11 formed by a network skeleton to be stretched in the direction of rolling (represented by the arrow in FIG. 1(a)) to form pores 12 having a shape similar to ellipsoid or deformed ellipsoid having a long axis. The porous metal material 10 was then cut in such a manner that the longitudinal direction of the pore 12 having a shape similar to ellipsoid or deformed ellipsoid coincides with the crosswise direction of the electrode plate to form a nickel electrode plate 13.

Thereafter, the nickel electrode plate 13 thus formed with a predetermined shape was subjected to roller treatment through a series of rollers in the longitudinal direction (direction perpendicular to the rolling direction). In this manner, numerous cracks 14 were formed in the direction parallel to the rolling direction as shown diagrammatically in FIG. 1(c) to prepare a nickel electrode plate 13 of the present example. The numerous cracks 14 are formed in the crosswise direction of pore 12 as shown diagrammatically in FIG. 1(c). Therefore, these cracks 14 are formed at a very small pitch.

(2) Comparative Example 1

A porous metal material (active material retaining material) 20 comprising a foamed nickel material (provided with a three-dimensionally continuous network skeleton) having a porosity of 97% and a thickness of about 1.5 mm was then filled with the same active material slurry as prepared in the foregoing example in such an amount that the active material packing density after rolling reached 2.8 g/cm$^3$-void. As shown diagrammatically in FIG. 2(a), the porous metal material 20 is provided with numerous pores 21 formed by a network skeleton on the plane thereof. PPI (number of pores per inch of length) of these numerous pores 21 is adjusted to 50.

The porous metal material 20 was dried, and then rolled to a thickness of about 0.7 mm. As shown diagrammatically in FIG. 2(b), this rolling causes the pores 21 formed by a network skeleton to be stretched in the direction of rolling (represented by the arrow in FIG. 2(a)) to form pores 22 having a shape similar to ellipsoid or deformed ellipsoid having a long axis. The porous metal material 20 was then cut in such a manner that the longitudinal direction of the pore 22 having a shape similar to ellipsoid or deformed ellipsoid coincides with the crosswise direction of the electrode plate to form a nickel electrode plate 23.

Thereafter, the nickel electrode plate 23 thus formed with a predetermined shape was subjected to roller treatment through a series of rollers in the longitudinal direction (direction parallel to the rolling direction). In this manner, numerous cracks 24 were formed in the direction perpendicular to the rolling direction as shown diagrammatically in FIG. 2(c) to prepare a nickel electrode plate 23 of Comparative Example 1. The numerous cracks 24 are formed in the direction along the long axis of pore 22 as shown diagrammatically in FIG. 2(c). Therefore, these cracks 24 are formed at a long pitch.

(3) Comparative Example 2

A porous metal material (active material retaining material) 30 comprising a foamed nickel material (provided with a three-dimensionally continuous network skeleton) having a porosity of 97% and a thickness of about 1.5 mm was then filled with the same active material slurry as prepared in the foregoing example in such an amount that the active material packing density after rolling reached 2.8 g/cm$^3$-void. As shown diagrammatically in FIG. 3(a), the porous metal material 30 is provided with numerous pores 31 formed by a network skeleton on the plane thereof. PPI (number of pores per inch of length) of these numerous pores 31 is adjusted to 50.

The porous metal material 30 was dried, and then rolled to a thickness of about 0.7 mm. As shown diagrammatically in FIG. 3(b), this rolling causes the pores 31 formed by a network skeleton to be stretched in the direction of rolling (represented by the arrow in FIG. 3(a)) to form pores 32 having a shape similar to ellipsoid or deformed ellipsoid having a long axis. The porous metal material 30 was then cut in such a manner that the longitudinal direction of the pore 32 having a shape similar to ellipsoid or deformed ellipsoid coincides with the crosswise direction of the electrode plate to form a nickel electrode plate 33.

(4) Comparative Example 3

A porous metal material (active material retaining material) 40 comprising a foamed nickel material (provided with a three-dimensionally continuous network skeleton) having a porosity of 97% and a thickness of about 1.5 mm was then filled with the same active material slurry as prepared in the foregoing example in such an amount that the active material packing density after rolling reached 2.8 g/cm$^3$-void. As shown diagrammatically in FIG. 4(a), the porous metal material 20 is provided with numerous pores 41 formed by a network skeleton on the plane thereof. PPI (number of pores per inch of length) of these numerous pores 41 is adjusted to 50.

The porous metal material 40 was dried, and then rolled to a thickness of about 0.7 mm. As shown diagrammatically in FIG. 4(b), this rolling causes the pores 41 formed by a network skeleton to be stretched in the direction of rolling (represented by the arrow in FIG. 4(a)) to form pores 42 having a shape similar to ellipsoid or deformed ellipsoid having a long axis. The porous metal material 40 was then cut in such a manner that the longitudinal direction of the pore 42 having a shape similar to ellipsoid or deformed ellipsoid coincides with the crosswise direction of the electrode plate to form a nickel electrode plate 43.

2. Preparation of Negative Electrode

Amischmetal (Mm: mixture of rare earth elements), nickel, cobalt, aluminum and manganese were mixed at a ratio of 1:3.4:0.8:0.2:0.6. The mixture was then subjected to induction heating in a high-frequency induction furnace in an argon gas atmosphere to form a molten alloy. The molten alloy thus obtained was casted into a mold, and then cooled by a known method to prepare an ingot of hydrogen-occluding alloy represented by the composition formula $Mm_{1.0}Ni_{3.4}Co_{0.8}Al_{0.2}Mn_{0.6}$.

The ingot of hydrogen-occluding alloy was mechanically granulated, and then mechanically ground to an average particle diameter of about 50 µm. The hydrogen-occluding alloy powder thus obtained was then mixed with a binder such as polyethylene oxide and a proper amount of water to prepare a hydrogen-occluding alloy slurry. The slurry thus prepared was applied to an active material retaining material made of a punching metal on the both sides thereof in such an amount that the active material density after rolling reached a predetermined value, dried, rolled, and then cut to a predetermined size to prepare a hydrogen-occluding alloy negative electrode plate 50.

3. Preparation of Nickel-hydrogen Battery

The nickel positive electrode plate 13 of Example and the nickel positive electrode plates 23, 33 and 43 of Comparative Examples 1 to 3 thus prepared were each spirally wound with the hydrogen-occluding alloy negative electrode prepared above with a separator 60 (thickness: about 0.15 mm) made of a nonwoven polypropylene or nylon cloth provided interposed therebetween to prepare spiral electrode blocks a, x, y and z, respectively. The block prepared with the nickel positive electrode plate 13 was designated as spiral electrode block a, the block prepared with the nickel positive electrode plate 23 was designated as spiral electrode block x, the block prepared with the nickel positive electrode plate 33 was designated as spiral electrode block y, and the block prepared with the nickel positive electrode plate 43 was designated as spiral electrode block z.

The nickel positive electrode plate 13 of Example and the nickel positive electrode plate 33 of Comparative Example 2 were each wound in the crosswise direction of the pores 12 and 32 having a shape similar to ellipsoid or deformed ellipsoid having a long axis, respectively. The nickel positive electrode plate 23 of Comparative Example 1 and the nickel positive electrode plate 43 of Comparative Example 3 were each wound in the direction along the long axis of the pores 22 and 42 having a shape similar to ellipsoid or deformed ellipsoid having a long axis, respectively.

To the terminal 50a of the negative electrode plate of the various spiral electrode blocks thus prepared were each connected a negative electrode collector. To the terminals 13a, 23a, 33a and 43a of the various nickel positive electrode plates 13, 23, 33 and 43 were each connected a positive electrode collector, respectively, to prepare various electrodes. Subsequently, the various electrodes were each inserted into a closed-end cylindrical metallic outer can. The negative electrode collector was then spot-welded to the bottom of the metallic outer can. Thereafter, a lead plate extending from the positive electrode collector was welded to the bottom of a sealing material.

Thereafter, into these outer cans were each injected an electrolytic solution (7.5 N aqueous solution of potassium hydroxide (KOH) containing lithium hydroxide (LiOH) and sodium hydroxide (NaOH)). The sealing material was then caulked to the opening of the outer can with a sealing gasket provided interposed therebetween to seal the outer can. In this manner, cylindrical nickel-hydrogen storage batteries A1 (comprising the spiral electrode block a), X1 (comprising the spiral electrode block x), Y1 (comprising the spiral electrode block y) and Z1 (comprising the spiral electrode block z) having a nominal capacity of 1,200 mAH were prepared.

4. Battery Tests (1) Measurement of Roundness of Electrode Block

The various spiral electrode blocks a, x, y and z thus prepared were each measured for long axis length and short axis length. From these measurements, the ratio of short axis length to long axis length was calculated to determine roundness. The results are set forth in Table 1.

(2) Shortcircuiting Test 100 samples were prepared each for the batteries A1, X1, Y1 and Z1 thus prepared. These 100 samples of batteries A1, X1, Y1 and Z1 were each then measured for battery voltage. When the battery voltage thus measured was 0.1 V or less, the battery was judged to be short-circuited. The number of short-circuited samples was then determined. The results are set forth in Table 1.

TABLE 1

| Kind of battery | % Roundness | Number of short-circuited samples |
| --- | --- | --- |
| A1 | 99.5 | 0/100 |
| X1 | 96.0 | 6/100 |
| Y1 | 97.0 | 5/100 |
| Z1 | 95.5 | 8/100 |

As can be seen in Table 1 above, the batteries X1, Y1 and Z1 of Comparative Examples 1 to 3, respectively, have a low roundness and thus are liable to break or cracking of electrode plate during winding that penetrates the separator, causing internal shortcircuiting. On the contrary, the battery A1 of Example comprises a coil having an almost round shape and thus is not liable to break or destruction of electrode plate during winding, causing no shortcircuiting. The reason for this phenomenon can be thought as follows.

In other words, referring to the battery A1 of Example, the porous metal material is rolled in the direction along the crosswise direction of the electrode plate 13 (see FIG. 1). Therefore, the pores 11 formed by a network skeleton in the porous metal material 10 were stretched in the direction along the crosswise direction of the electrode plate 13 so that the short axis of these pores 12 are oriented in the longitudinal direction of the electrode plate 13. In this arrangement, the porous metal material is kept flexible in the longitudinal direction of the electrode plate 13 which is the winding direction of the electrode plate 13. Further, roller treatment causes the cracks 14 to be oriented in the longitudinal direction (winding direction) of the electrode plate 13 at a very small pitch. In this arrangement, the load applied to the electrode plate 13 during winding can be dispersed even if the density or thickness of the electrode plate 13 is increased. Thus, the windability is improved to give an enhanced roundness and hence decrease the occurrence of shortcircuiting.

On the other hand, referring to the battery X1 of Comparative Example 1, the porous metal material is rolled in the longitudinal direction of the electrode plate 23 (see FIG. 2). Thus, when a load is applied to the porous metal material in the longitudinal direction (winding direction) of the electrode plate 23, the porous metal material 20 undergoes plastic deformation resulting in work hardening in the winding direction of the electrode plate 23. Further, even if roller treatment can cause cracks 24 to be introduced in the crosswise direction of the electrode plate 23, the pores 21 formed by a network skeleton in the porous metal material 20 are oriented in the longitudinal direction of the electrode plate 23, causing the long axis of the pores 22 to be oriented in the longitudinal direction of the electrode plate 23. Accordingly, the pitch between the cracks 24 in the longitudinal direction of the electrode plate 23 increases according to the long axis of the pores 22. Thus, the resulting windability is deteriorated to give a lowered roundness and hence increase the occurrence of internal shortcircuiting.

Referring to the battery Y1 of Comparative Example 2, the porous metal material is rolled in the crosswise direction of the electrode plate 33 (see FIG. 3). Thus, the pores 31 formed by a network skeleton in the porous metal material 30 are stretched in the crosswise direction of the electrode plate 33 so that the short axis of the pores 32 are oriented in the longitudinal direction of the electrode plate 33. In this arrangement, the porous metal material can be kept flexible in the longitudinal direction of the electrode plate 33 which is the winding direction of the electrode plate 33. However, since no roller treatment is effected, the load applied to the electrode plate 33 during winding cannot be dispersed with the increase of the density or thickness of the electrode plate 33. Thus, the resulting windability is deteriorated to give a lowered roundness and hence increase the occurrence of internal shortcircuiting.

Referring to the battery Z1 of Comparative Example 3, the porous metal material is rolled in the longitudinal direction of the electrode plate 43 (see FIG. 4). When a load is applied to the porous metal material in the longitudinal direction (winding direction) of the electrode plate 43, the porous metal material 40 undergoes plastic deformation resulting in work hardening in the winding direction of the electrode plate 43. Further, since no roller treatment is effected, the load applied to the electrode plate 43 during winding cannot be dispersed. Thus, the resulting windability is deteriorated to give a lowered roundness and hence increase the occurrence of internal shortcircuiting.

(3) Measurement of Basic Capacity

The batteries A1, X1, Y1 and Z1 thus prepared were each charged with a current of 120 mA (0.1C) at room temperature (ambient temperature: 25° C.) for 16 hours. After one hour of discontinuance, these batteries were each discharged with a current of 24 mA (0.2C) until the battery voltage reached 1.0 V. Thereafter, one hour of discontinuance was made. This cycle was effected three times to activate the batteries A1, X1, Y1 and Z1. The discharge capacity measured at the 3rd cycle was defined to be basic capacity.

(4) High Rate Dischargeability Test

The batteries A1, X1, Y1 and Z1 were each measured for basic capacity in the manner as mentioned above. These batteries were each then charged with a current of 120 mA (0.1C) at room temperature (ambient temperature: 25° C.) for 16 hours. After one hour of discontinuance, these batteries were each then discharged with a current of 3,600 mA (3C) until the battery voltage reached 1.0 V. The discharge capacity was then measured. The ratio of the discharge capacity to the foregoing basic capacity was then determined as high rate dischargeability at 3C. The results are set forth in Table 2.

Further, these batteries were each charged with a current of 120 mA (0.1C) at room temperature (ambient temperature: 25° C.) for 16 hours. After one hour of discontinuance, these batteries were each discharged with a current of 6,000 mA (5C) until the battery voltage reached 1.0 V. The discharge capacity was then measured. The ratio of the discharge capacity to the foregoing basic capacity was then determined as high rate dischargeability at 5C. The results are set forth in Table 2. In Table 2, the high rate dischargeability of the batteries X1, Y1 and Z1 of comparative examples are represented relative to that of the battery A1 of Example as 100.

TABLE 2

| Kind of battery | High rate dischargeability at 3C | High rate Dischargeability at 3C |
| --- | --- | --- |
| A1 | 100 | 100 |
| X1 | 85 | 64 |
| Y1 | 89 | 72 |
| Z1 | 81 | 62 |

As can be seen in Table 2, the batteries X1, Y1 and Z1 of Comparative Examples 1 to 3 all exhibit a deteriorated high rate dischargeability while the battery A1 of Example exhibits an excellent high rate dischargeability. Explaining possible reason for this phenomenon with the battery A1 of Example, when wound, less load is applied to the electrode plate 13. Thus, the local elongation of the electrode plate is decreased, preventing the occurrence of defects or damage in the network skeleton in the porous metal material 10 and hence making it possible to maintain the collecting properties of the porous metal material 10 high.

On the other hand, referring to the batteries X1 and Z1 of Comparative Examples 1 and 3, the rolling load is applied to the porous metal materials 20 and 40 only in the longitudinal direction of the electrode plates 23 and 43, respectively. Thus, the network skeleton in the porous metal materials 20 and 40 undergoes plastic deformation resulting in working strain or destruction. As a result, the porous metal materials 20 and 40 show deteriorated collecting properties and hence deteriorated high rate dischargeability. Referring to the batteries Y1 and Z1 of Comparative Examples 2 and 3, since the porous metal materials 30 and 40 are not subjected to roller treatment, stress cannot be dispersed during winding. Thus, local defects or destruction occur in the network skeleton in the porous metal materials 30 and 40, deteriorating the collecting properties and hence the high rate dischargeability of the porous metal materials 30 and 40.

(5) Cycle Life Test

Subsequently, the batteries A1, X1, Y1 and Z1 thus activated were each charged with a current of 1.2 A (1C) at an ambient temperature of 25° C. The peak value of battery voltage at the end of charging was remembered. When the battery voltage showed a drop by a predetermined value from the peak value as a reference, charging was terminated. After one hour of discontinuance, these batteries were each discharged with a current of 1.2 A (1C) until the battery voltage reached 1.0 V. One hour of discontinuance was made. This cycle life test was then continued. When the discharge capacity reached 60% of the initial capacity, the battery was judged to complete its life. The results are set forth in Table 3 below.

TABLE 3

| Kind of battery | Cycle life |
| --- | --- |
| A1 | 800 cycles |
| X1 | 650 cycles |
| Y1 | 680 cycles |
| Z1 | 580 cycles |

As can be seen in Table 3 above, the batteries X1, Y1 and Z1 of Comparative Examples 1 to 3 all exhibit a deteriorated cycle life while the battery A1 of Example exhibits an excellent cycle life.

Explaining possible reason for the phenomenon with the battery A1 of Example, no defects or destruction occur in the skeleton network in the porous metal material 10. Thus, the collecting properties of the porous metal material 10 can be kept high to accelerate uniform charge-discharge reaction on the positive electrode plate and hence the swelling of the active positive electrode material. Accordingly, the cycle life can be prolonged. On the other hand, referring to the batteries X1, Y1 and Z1 of Comparative Examples 1, 2 and 3, local defects or destruction occur in the network skeleton in the porous metal materials 20, 30 and 40, deteriorating the collecting properties of the porous metal materials 20, 30 and 40 and hence preventing uniform charge-discharge reaction on the positive electrode plate. Thus, the cycle life is deteriorated.

5. Relationship Between PPI and Roundness

The relationship between PPI value (number of pores formed by the network skeleton in the porous metal material per inch length on the plane of the porous metal material) and roundness when the weight (per unit area) of the porous metal material is kept constant was then studied.

Electrode blocks for the battery A of Example were prepared in the same manner as used in the preparation of the battery A1 of Example from porous metal materials having PPI values of 50 (A1 of Example), 100, 200 and 250. These electrode blocks were each then measured for roundness (ratio of short axis length to long axis length of electrode block). The results are set forth in Table 4 below.

Separately, electrode blocks for the battery X of Example were prepared in the same manner as used in the preparation of the battery X1 of Comparative Example 1 from porous metal materials having PPI values of 50 (X1 of Comparative Example 1), 100, 200 and 250. These electrode blocks were each then measured for roundness (ratio of short axis length to long axis length of electrode block). The results are set forth in Table 4 below.

TABLE 4

| Kind of battery | % Roundness | | | |
| --- | --- | --- | --- | --- |
| | 50 PPI | 100 PPI | 200 PPI | 250 PPI |
| A | 99.5 | 99.6 | 99.3 | 99.4 |
| X | 96.0 | 96.9 | 97.5 | 99.0 |

By lowering PPI value of porous metal material, high density packing can be made without lowering the packing of active material. Thus, as a method for enhancing the capacity there needs to be used a method involving the reduction of PPI value. However, as can be seen in Table 4 above, the battery X of comparative example, which has a PPI value of 200 or less, shows a drastic drop of roundness from that of the battery A of Example. On the contrary, the battery A of Example A shows no drop of roundness even if PPI value is 200 or less. This demonstrates that PPI value of the porous metal material is preferably 200 or less to maximize the effect that makes it possible to produce a high capacity and quality battery.

6. Relationship Between Packing Density of Active Material and Roundness

Electrode blocks for the battery A of Example were prepared in the same manner as used in the preparation of the battery A1 of Example with the packing density of active material being varied to 2.5 g/cm³-void, 2.6 g/cm³-void, 2.7 g/cm³-void, 2.8 g/cm³-void (battery A1 of Example), and 2.9 g/cm³-void. These electrode blocks were each then measured for roundness (ratio of short axis length to long axis length of electrode block). The results are set forth in Table 5 below.

Separately, electrode blocks for the battery X of comparative Example 1 were prepared in the same manner as used in the preparation of the battery X1 of Comparative Example 1 with the packing density of active material being varied to 2.5 g/cm³-void, 2.6 g/cm³-void, 2.7 g/cm³-void, 2.8 g/cm³-void (battery X1 of Comparative Example 1), and 2.9 g/cm³-void. These electrode blocks were each then measured for roundness (ratio of short axis length to long axis length of electrode block). The results are set forth in Table 5 below.

TABLE 5

| Kind of battery | % Roundness | | | | |
| --- | --- | --- | --- | --- | --- |
| | 2.5 g/cm³-void | 2.6 g/cm³-void | 2.7 g/cm³-void | 2.8 g/cm³-void | 2.9 g/cm³-void |
| A | 99.7 | 99.7 | 99.6 | 99.5 | 99.2 |
| X | 99.6 | 98.3 | 97.8 | 96.0 | 95.2 |

In order to enhance the capacity of the battery, it is necessary to pack the active material at a high density. However, packing at a high density causes work hardening of the electrode plate leading to the deterioration of windability (deterioration of roundness). As can be seen in Table 5 above, the battery X of comparative example shows a drastic drop of roundness as the packing density of active material increases beyond 2.6 g/cm³-void. On the other hand, the battery A of Example shows little or no drop of roundness even as the packing density of active material increases beyond 2.6 g/cm$^3$-void. This demonstrates that the packing density of active material is preferably 2.6 g/cm$^3$-void or more to maximize the effect that makes it possible to produce a high capacity battery having an enhanced windability.

As mentioned above, in the present invention, when cracks are formed in parallel to the longitudinal direction of pores which have been stretched to have a planar shape similar to ellipsoid or deformed ellipsoid having a long axis, these cracks are oriented in the crosswise direction of the pores which have been stretched to have a shape similar to ellipsoid or deformed ellipsoid so that they are arranged at a very small pitch. Accordingly, by spirally winding this electrode plate on a winding axis parallel to these cracks, an electrode coil having an substantially round shape can be formed. As a result, the windability of the electrode plate can be improved, making it possible to obtain a high capacity and quality storage battery.

Further, since cracks are formed at a very small pitch and the electrode plate is wound in the direction of formation of cracks, shortcircuiting caused by cracking can be prevented. At the same time, since the electrode plate is wound in the crosswise direction of the pores formed by a network skeleton, the load applied to the porous metal material during winding can be reduced, inhibiting local elongation of the electrode plate and hence preventing the occurrence of defects such as break of network skeleton in the porous metal material. As a result, the collecting properties can be improved, making it possible to obtain a high capacity and quality storage battery.

The embodiment of implication of the present invention has been described with reference to the case where a porous metal material (foamed nickel) having a thickness of 1.5 mm which has been filled with an active material is rolled to a thickness of 0.7 mm. However, the thickness of the porous metal material (foamed nickel) to be used and the thickness to which the porous metal material should be rolled may be properly predetermined according to the required capacity of electrode plate.

The embodiment of implication of the present invention has also been described with reference to the case where the present invention is applied to nickel-hydrogen storage battery. However, it is obvious that the present invention is not limited to nickel-hydrogen storage battery but can be applied also to other storage batteries such as nickel-cadmium storage battery.

What is claimed is:

1. A method of fabricating an alkaline storage battery comprising a step of filling a porous metal material provided with a three-dimensionally continuous network skeleton with an active material to form a non-sintered electrode and a step of spirally winding said electrode with an opposing electrode with a separator provided interposed therebetween to form an electrode block, wherein the method comprises the steps of:

(a) rolling said non-sintered electrode having said network skeleton of said porous metal material filled with said active material to a predetermined thickness;

(b) passing said non-sintered electrode which has been rolled to a predetermined thickness through a series of rollers in a direction perpendicular to the folling direction during said rolling step so that cracks which are oriented in the direction perpendicular to said rolling direction are formed in parallel to said rolling direction; and (c) winding said non-sintered electrode in such an arrangement that said cracks formed during said roller treatment step are oriented in parallel to the winding axis.

2. The method of fabricating an alkaline storage battery according to claim 1, wherein the roller treatment step comprises a step of forming cracks by using a stepped roller.

3. The method of fabricating an alkaline storage battery according to claim 1, wherein said rolling step involves stretching said pores formed by said network skeleton of said porous metal material on the plane thereof to have a planar shape having a long axis and adjusting the number of pores formed said network skeleton on the plane of said electrode plate per inch of length to 200 (200 PPI) or less.

4. The method of fabricating an alkaline storage battery according to claim 1, wherein said porous metal material is filled with said active material at a packing density of 2.6 g/cm$^3$-void or more.

5. The method of fabricating an alkaline storage battery according to claim 1, further comprising a step of cutting the wherein said porous metal material filled with said active material so as to have a predetermined width after rolling step and prior to the roller treatment step.

* * * * *